US006824467B2

(12) United States Patent
Schlottmann et al.

(10) Patent No.: US 6,824,467 B2
(45) Date of Patent: Nov. 30, 2004

(54) MODELED GAMES AND PAY TABLE GENERATION AND EVALUTION THEREFOR

(75) Inventors: Gregory Schlottmann, Reno, NV (US); Jamal Benbrahim, Reno, NV (US); Bryan Wolf, Reno, NV (US); William R. Brosnan, Reno, NV (US)

(73) Assignee: IGT, Reno, NV (US)

( * ) Notice: Subject to any disclaimer, the term of this patent is extended or adjusted under 35 U.S.C. 154(b) by 215 days.

(21) Appl. No.: 10/078,295

(22) Filed: Feb. 18, 2002

(65) Prior Publication Data

US 2003/0176212 A1 Sep. 18, 2003

(51) Int. Cl.[7] .......................... A63F 13/00; A63D 13/00
(52) U.S. Cl. ...................... 463/20; 463/16; 273/121 B
(58) Field of Search .............................. 463/16, 20, 25, 463/26; 273/121 B, 138, 138.1

(56) References Cited

U.S. PATENT DOCUMENTS

| | | | |
|---|---|---|---|
| 5,131,655 A | 7/1992 | Ugawa | 273/121 B |
| 5,509,655 A | 4/1996 | Ugawa | 273/121 B |
| 5,722,891 A | 3/1998 | Inoue | 463/20 |
| 5,725,210 A | 3/1998 | Yamaguchi et al. | 273/121 B |
| 5,836,819 A | 11/1998 | Ugawa | 463/30 |
| 6,029,973 A | 2/2000 | Takemoto | 273/121 B |
| 6,047,963 A | 4/2000 | Pierce et al. | 273/121 B |
| 6,139,013 A | 10/2000 | Pierce et al. | 273/121 B |
| 6,159,095 A | 12/2000 | Frohm et al. | 463/19 |
| 6,203,009 B1 | 3/2001 | Sines et al. | 273/121 B |
| 6,203,428 B1 | 3/2001 | Giobbi et al. | 463/16 |
| 6,213,875 B1 | 4/2001 | Suzuki | 463/20 |
| 6,220,593 B1 | 4/2001 | Pierce et al. | 273/138.1 |
| 6,296,568 B1 * | 10/2001 | Tracy | 463/17 |
| 6,569,013 B1 * | 5/2003 | Taylor | 463/13 |
| 2002/0163122 A1 * | 11/2002 | Vancura | 273/138.1 |

OTHER PUBLICATIONS

Programming assignment "Cp6 Random Walks: or, the Pachinko Machine" from SC 151 section 002 accessed at [www.cs.unm.edu/~ingber/CS151/Assignments/Pachinko/Pachinko.html] dated at least 1999.*

* cited by examiner

Primary Examiner—Jessica J. Harrison
(74) Attorney, Agent, or Firm—George H. Gerstman; Seyfarth Shaw LLP

(57) ABSTRACT

A video gaming machine simulates a real physical game, such as pachinko, by providing a mathematical model of the game including rules governing movement of an object placed in motion in accordance with a set of initial conditions. A pay table for the game is developed by creating a list of outcomes, assigning a probability of occurrence to each outcome, assigning a win amount to each outcome, and determining a pay table percentage by multiplying each outcome's probability of occurrence by its win amount and summing the products for all of the outcomes in the list. Creation of the list of outcomes and assignment of probabilities of occurrence may be effected by a Monte Carlo test. The game is played by randomly selecting a set of initial conditions and running them through the model.

42 Claims, 13 Drawing Sheets

MODELED GAMES AND PAY TABLE GENERATION AND EVALUTION THEREFOR

BACKGROUND

This application relates to gaming machines and, in particular, to video gaming machines of the type which simulate real physical games. The application relates in particular to techniques for operating such video gaming machines and for developing pay tables therefor.

A number of physical games involve the movement of one or more objects on a play field. Such games may include pinball, pachinko, roulette, craps and the like. Each of these games is initiated by placing an object in motion in accordance with a set of initial conditions and proceeding to one of a plurality of outcomes corresponding, respectively, to final resting conditions of the object or objects.

In pachinko and pinball, the object is a ball which is launched onto a play field with a particular velocity in a particular direction and, perhaps, with a particular spin. These initial conditions determine the initial trajectory of the ball. The trajectory and velocity of the ball are changed en route by obstacles in the play field, such as pins or pegs or flippers or the like. Plural balls may simultaneously be traveling along the play field, particularly in pachinko. The fundamental difference between pachinko and pinball is that, in pachinko, the trajectory-changing obstacles in the play field are fixed and passive, whereas in pinball they may be movable and active and, indeed, may be player-controllable. In a game such as roulette, which is played with a single ball, the play field itself, which includes a rotatable roulette wheel, is movable relative to a fixed reference, in addition to the ball being movable relative to the play field, both the ball and the wheel being placed into motion by a croupier. In craps, the object is a cubical die with numbered faces, the game being initiated by a player manually casting a pair of dice onto the play field. In games such as pachinko and craps, wherein plural objects simultaneously occupy the play field, the routes of the objects are complicated by the fact that they can collide with each other. The details of play of these games will be well understood by those of ordinary skill in the gaming arts. In such real physical games, there is no need for a pay table to determine the outcome or the win amount. Rather, they rely on actual physical resting conditions of the objects. However, in an electronic version of such games on a video platform, a method of producing and reliably evaluating a pay table is required.

Prior video gaming machines which simulate such real physical games as those described above have provided a storage medium which stores a plurality of "plays" of the game, such as a plurality of different object routes from a starting condition to a final outcome. Win amounts are assigned to each of these stored "plays". A play is initiated by a player "depositing" a wager amount and activating the machine, which then randomly selects one of the stored object routes and displays it on a video display and then awards the player the corresponding win amount. The display may include a background display of the play field, as well as a superimposed display of the randomly selected object route. The object routes could be stored, for example, by videotaping actual plays of physical games and storing them in analog or digital form. A drawback of this approach is that the number of object routes which can be stored is rather limited. Thus, during an extended player session at the machine, a particular route, and therefore, outcome, may occur more than once, seriously detracting from the randomness and, therefore, the realism of the game.

SUMMARY

This application relates to video gaming machines and methods of operating such machines which avoid the disadvantages of prior video gaming techniques while affording additional structural and operating advantages.

An important aspect is the provision of a video gaming machine of the type which simulates a real physical game, and which more realistically simulates the randomness of the real physical game.

Another aspect is the provision of a video gaming machine which is based on a mathematical model of a real physical game.

Another aspect is the provision of a method for accurately developing a pay table for a modeled game on a video gaming platform.

Certain ones of these and other aspects may be obtained by providing a method of operating a video gaming machine which simulates a real physical game initiated by placing an object in motion in accordance with a set of initial conditions and proceeding to one of a plurality of outcomes corresponding respectively to final resting conditions of the object, the method comprising: establishing in software a mathematical model of the game including a plurality of rules governing movement of the object once it is placed in motion, establishing a range of possible values for each of a plurality of parameters, randomly selecting for each parameter a value from its associated range of values to establish the set of initial conditions, running the set of initial conditions through the model for simulating movement of the object to a final resting condition to determine the outcome, and displaying the simulated movement of the object.

Further aspects may be attained by providing a method of operating a video gaming machine which simulates a real physical game initiated by placing an object in motion in accordance with a set of initial conditions and proceeding along a route to one of a plurality of outcomes corresponding respectively to final resting conditions of the object, the method comprising: determining a finite collection of points on a play field including a route starting point and at least one route end point corresponding to a final resting condition and a finite collection of possible paths of the object from one point to another such that each point except route end points may have one or more paths leading away from it, assigning a probability of occurrence to each path and to each point, randomly selecting a path from among the paths leading away from the route starting point in accordance with their probabilities of occurrence, causing the object to traverse the selected path to the point it leads to, then randomly selecting a path from among the paths starting at the point at which the object is currently located in accordance with their probabilities of occurrence, then repeating the preceding two steps until a route end point is reached, and displaying the simulated movement of the object from route staring point to the route end point.

Still other aspects may be attained by providing a video gaming machine which simulates a real physical game initiated by placing an object in motion in accordance with a set of initial conditions and proceeding to one of a plurality of outcomes corresponding respectively to final resting conditions of the object, the gaming machine comprising: a player input device for activating the game, a display device, a processor operating under control of a stored program and responsive to the input device for controlling the display device, a memory device coupled to the processor and storing a mathematical model of the game including a plurality of rules governing movement of the object once it is placed in motion, and a pay table of win amounts respectively corresponding to different outcomes, and a payout mechanism, the processor program including a first routine responsive to a player input for randomly determining an origin state and running it through the model for simulating movement of the object to a final resting condition to determine an outcome and controlling the display device to display the simulated movement of the object, and a second routine for determining from the pay table a win amount corresponding to the outcome and actuating the payout mechanism to award that amount to the player.

Still other aspects may be attained by providing a method of developing a pay table for a video gaming machine which simulates a real physical game initiated by placing an object in motion in accordance with a set of initial conditions and proceeding to one of a plurality of outcomes corresponding respectively to final resting conditions of the object, the method comprising: establishing in software a mathematical model of the game including a plurality of rules governing movement of the object once it is placed in motion, creating a list of outcomes, assigning a probability of occurrence to each outcome, assigning a win amount to each outcome, and determining a pay table percentage by multiplying each outcome's probability of occurrence by its win amount and summing the products for all of the outcomes in the list.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
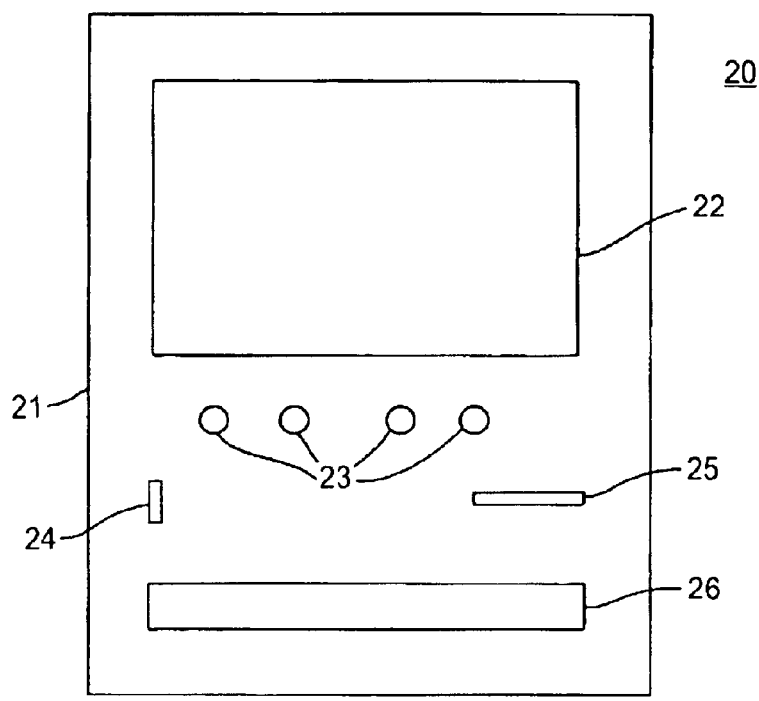
FIG. 1 is a simplified front elevational view of a video gaming machine.
Figure 2:
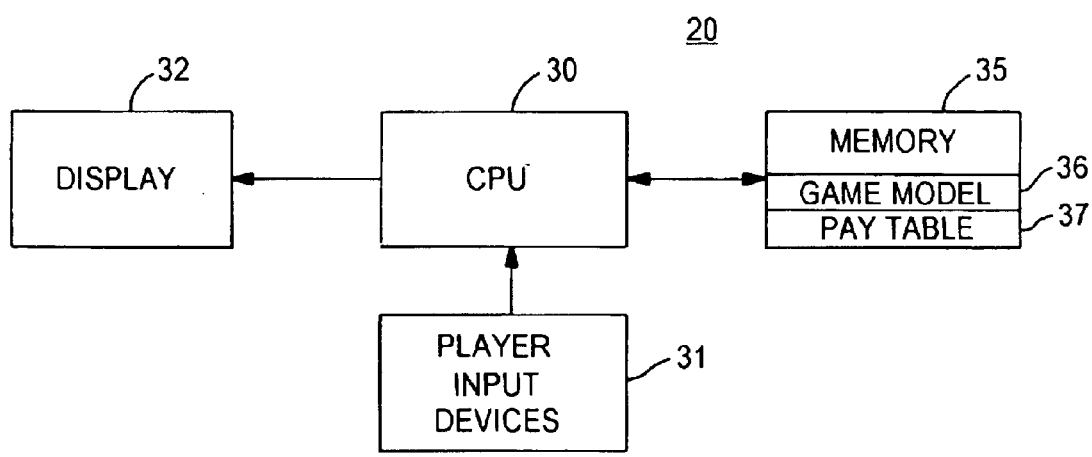
FIG. 2 is a functional block diagrammatic illustration of the video gaming machine of FIG. 1.

Referring to FIGS. 1 and 2, there is illustrated a video gaming machine, generally designated by the numeral 20. The gaming machine 20 has a housing 21 containing a video display 22 and a number of player control buttons or other types of actuators 23. Typically, the gaming machine 20 will also include a wager-receiving apparatus, which may include a coin or token slot 24 and a bill or card slot 25. Typically, the gaming machine 20 will also be provided with a payout tray 26 and/or a slot for dispensing tickets or the like. Referring to FIG. 2, the gaming machine 20 includes a central processing unit ("CPU") 30, to which it is connected player input devices 31, which may include the buttons 23 and the slots 24 and 25 and associated mechanisms. The CPU 30 is also connected to a display circuit 32, which includes the video display screen 22, and to a memory 35, in which is stored a mathematical model 36 of the game and a pay table 37, as will be explained more fully below. The gaming machine 20 is illustrated in very simplified form, since further details are well understood by those skilled in the art and are unnecessary for an understanding of the concepts of this application. It will be appreciated that many variations of the gaming machine 20 are available.

Figure 3:
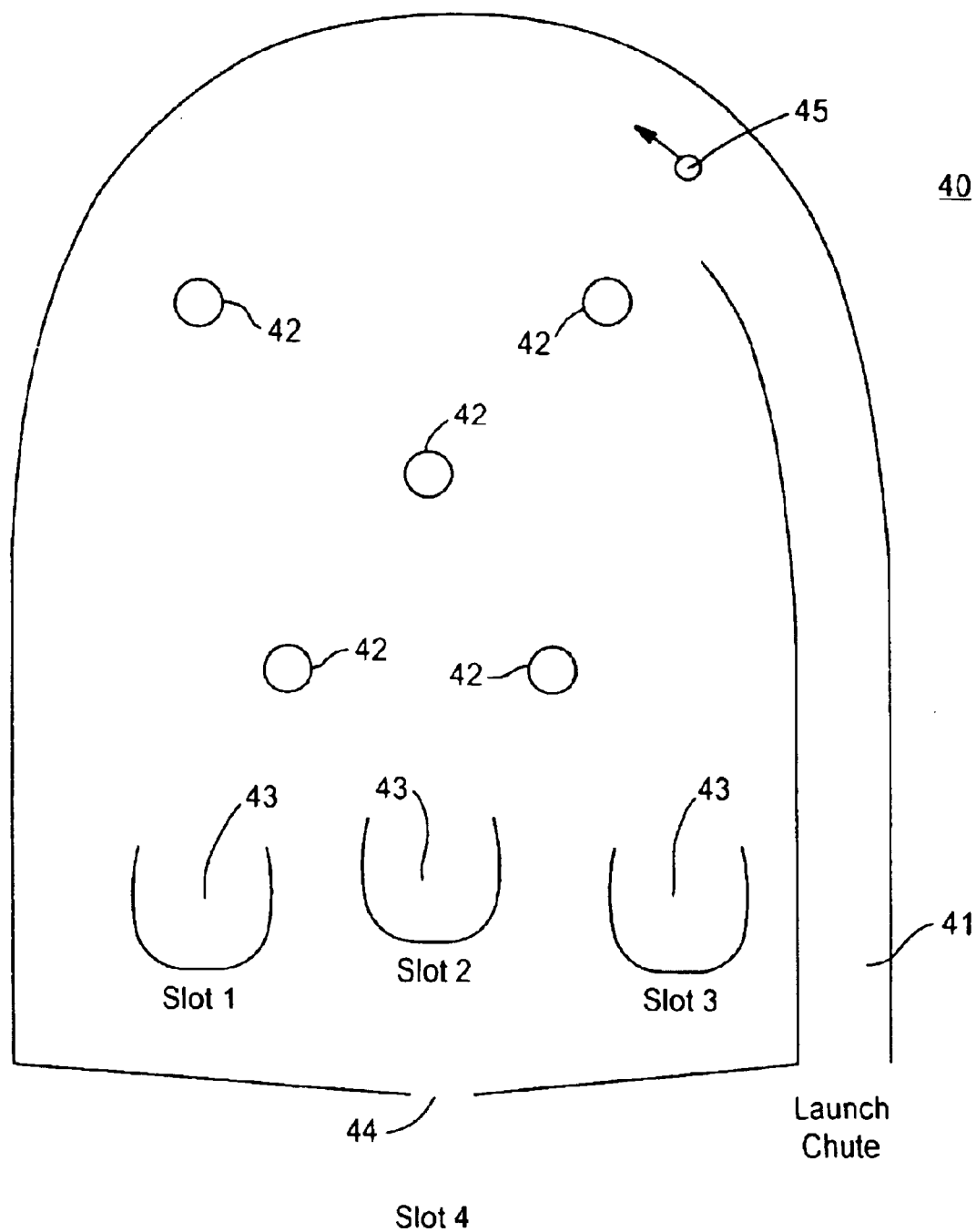
FIG. 3 is a simplified diagrammatic illustration of a pachinko game play field.

The concepts and principles of the present invention will be described in the context of a pachinko game, a simplified play field for which is illustrated in FIG. 3, but it will be appreciated that the principles of the invention are applicable to other types of games in which an object is placed in motion in accordance with a set of initial conditions and proceeds to one of a plurality of outcomes corresponding to final resting conditions of the object. Other examples of such games are described above. Referring to FIG. 3, the pachinko game will have a play field 40, which will be displayed on the video display screen 22 of the gaming machine 20. The play field includes a ball launch chute 41, a plurality of obstacles on the play field, which may be in the nature of pins or pegs 42, and a plurality of final destinations for the balls, which may include a plurality of pay slots 43, respectively designated "Slot 1", "Slot 2", and "Slot 3", as well as a non-pay slot 44 designated "Slot 4." While only a few of the pegs 42 and slots 43 and 44 are illustrated for simplicity, in a real pachinko game, and in a video representation thereof, there typically would be many more of these items, as well as various other display features.

In the play of an actual physical pachinko game, a ball 45 is launched from the bottom of the launch chute 41, exits the launch chute in the direction generally indicated by the arrow in FIG. 3 and will eventually fall by gravity toward the bottom of the play field, colliding with one or more pegs 42 or with the side walls of the play field along the way, and eventually falling into one of the slots 43 or 44. If a ball falls into one of the pay slots 43, the player will be awarded a certain win amount, which is generally a function of the likelihood of the ball falling into that slot. The highest likelihood, however, is that the ball will fall into the slot 44 which, accordingly, is a losing slot for which the win amount is zero. The game is typically played with a large number of balls which may be launched in rapid succession so that multiple balls are traversing the play field 40 at the same time. In this case, the balls can collide with one another, altering their routes along the play field. It will be appreciated that, in a real physical pachinko game, the routes of the balls can be controlled somewhat by the player who manually operates a launch mechanism, so that he can vary the force with which the ball is launched, the rapidity with which successive balls are launched, and, to a slight extent, the initial spin and direction of the ball. However, it will be appreciated that in a video version of the game, the initial conditions of each ball launch will be automatically governed by the gaming machine and, for any given ball launch, the only control the player has is to initiate the launch sequence and, therefore, control the time at which the launch occurs. In the video version of the game, an iconic representation of the ball is displayed and the game will simulate the physical movement of the ball along the play field and will display that simulated movement.

A significant aspect of the invention is that the actual play of the video game is based, not on a stored collection of ball routes, but rather on a mathematical model of the game stored in memory, which model includes a number of rules which govern the physical movement of the ball, using known mathematical modeling techniques, to which are applied a set of initial conditions under which the ball is placed in motion. In an actual physical game, it will be appreciated that this movement is affected by not only by the initial conditions or parameters under which the ball is launched, but also by the physical characteristics of the ball itself, the inclination of the play field, the physical characteristics of the play field, such as friction and the like, the arrangement of the play field boundary walls and obstacles and the like. Each time a ball collides with an obstacle, such as a wall of the play field, a peg 42, another ball or the like, the way in which its route will be altered will be a function of physical characteristics of the obstacle, such as shape, size resiliency, etc., and the trajectory, velocity and spin etc. of the ball at the time of collision. It can be seen that, in the physical game, these factors which affect ball movement are extremely complex and would be virtually impossible to completely accurately reproduce in a mathematical model. Thus, the model is necessarily somewhat simplified, but will, to the extent possible, represent realistic game conditions.

Also, as was indicated above, in the video version of the game, it will be necessary to provide a pay table to establish the win amounts corresponding to each of the possible outcomes of a given ball launch. In order to understand the techniques described below, the following terms and definitions are provided:

"Pay table development"—filling out all the data required for a complete pay table. Different styles of pay tables will require different data. One pay table may require only a list of types of wins and the amounts paid. Other pay tables may require probabilities of those wins.

"Pay table evaluation"—determining the payout percentage for the pay table.

"Payout percentage"—the average percentage of money taken in that is returned to the player. For a 90% game, on the average, a player can expect to win back 90% of the money he wagers.

"Game play"—applying the rules of the game model and the pay table to play a game and produce an outcome. The outcome is evaluated to determine the payout, as dictated by the pay table. That amount is then awarded to the player.

This application describes four basic techniques of developing a pay table and using it in the play of a game, although some of the steps of these techniques may be interchangeable, resulting in hybrid techniques.

Technique 1—Full Model Behavior

In this technique, the game model follows, as closely as possible, the behavior of a physical game. Since the model is deterministic, the outcome of the game is dependent only on the initial parameters of the game, i.e., the initial conditions of each ball launch, such as the speed, angle and spin of the ball. The following descriptions will be based on the assumption that these are the only relevant initial conditions, but it will be appreciated that other parameters could be added without affecting the technique.

In developing a pay table, there will likely be too many possible sets of initial parameters or conditions to test each set individually. For example, if each of the parameters speed, angle and spin may range from zero to 65,535, there are 281,474,976,710,656 possible sets of these three initial conditions and, therefore, possible ball routes or game plays. Accordingly, pay table development must be done using a Monte Carlo approach. In this approach, the game model randomly runs a large sample of games by randomly selecting a large number of sets of initial conditions (millions or more) and running them through the model, recording the outcome for each one. For example, the value of each parameter speed, angle and spin is randomly selected from its range (e.g. 0–65, 535) of possible values to arrive at a set of initial conditions, which is then run through the model, and the process is repeated. It will be appreciated that the number of possible outcomes is limited by the number of destination slots on the play field, i.e., in the example illustrated in FIG. 3, there are four possible outcomes for each ball route. After recording all of the outcomes, the program determines how frequently each outcome occurred and, thus, the probability of occurrence of each outcome, resulting, e.g., in data as set forth in Table 1.

TABLE 1

| Outcome | Probability |
| --- | --- |
| Slot 1 | 35% |
| Slot 2 | 9% |
| Slot 3 | 1% |
| Slot 4 | 55% |
| Total | 100% |

The pay table developer then assigns a win amount to each outcome, based upon its probability of occurrence, resulting, e.g., in a pay table such as Table 2.

TABLE 2

| Outcome | Probability | Win Amount |
| --- | --- | --- |
| Slot 1 | 35% | 1 |
| Slot 2 | 9% | 5 |
| Slot 3 | 1% | 15 |
| Slot 4 | 55% | 0 |
| Total | 100% | |

In order to evaluate the pay table, each win amount's contribution to the pay table percentage is computed as that win amount multiplied by the probability of occurrence of the corresponding outcome. The sum of all these win amount contributions is the pay table percentage. In this example, illustrated in Table 3, the pay table percentage is 95%.

TABLE 3

| Outcome | Probability | Win Amount | Contribution to paytable percentage |
|---|---|---|---|
| Slot 1 | 35% | 1 | 35% |
| Slot 2 | 9% | 5 | 45% |
| Slot 3 | 1% | 15 | 15% |
| Slot 4 | 55% | 0 | 0% |
| Total | 100% | | 95% |

The probability of occurrence information is inherent in the model and, therefore, need not be stored in the final pay table, which requires only the data set forth in Table 4.

TABLE 4

| Outcome | Win Amount |
|---|---|
| Slot 1 | 1 |
| Slot 2 | 5 |
| Slot 3 | 15 |
| Slot 4 | 0 |

Figure 4:
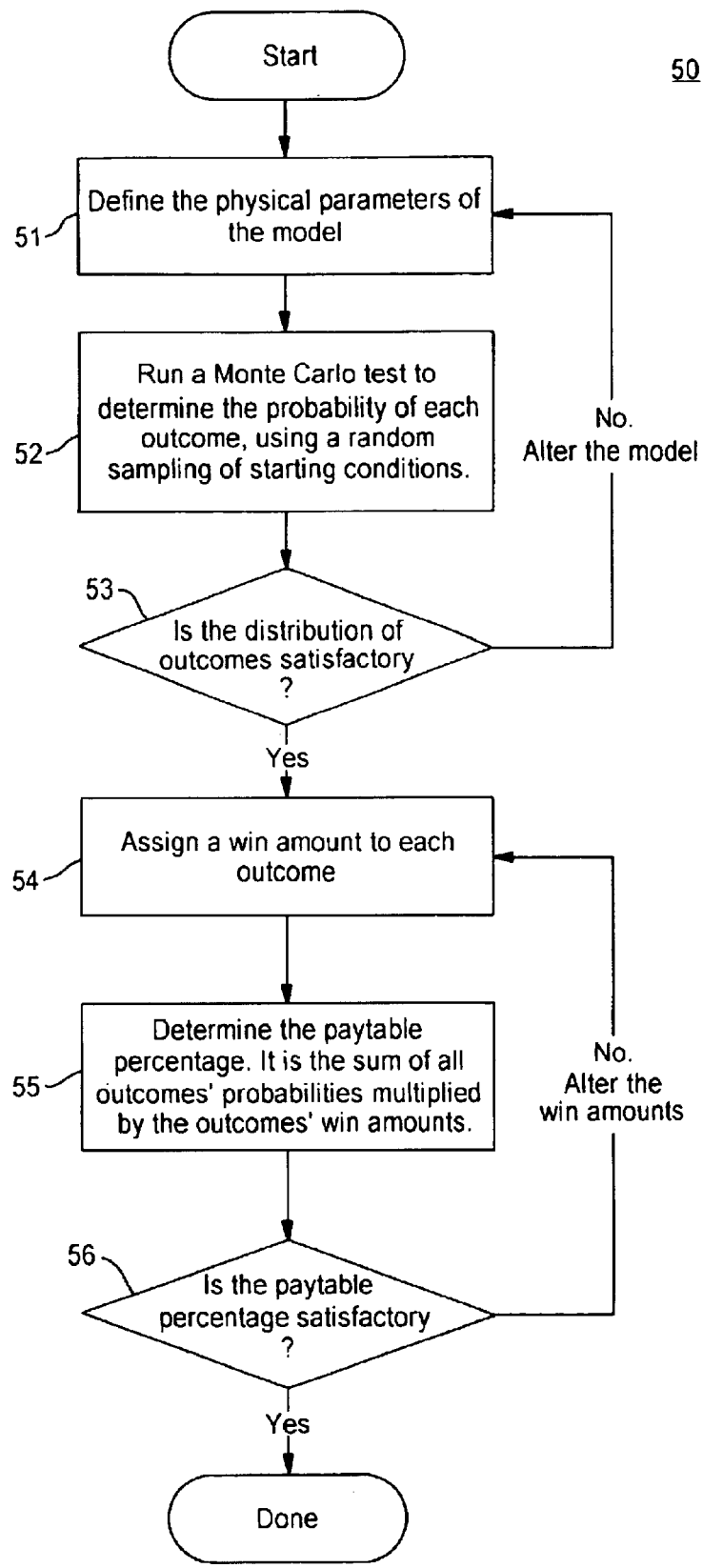
FIG. 4 is a simplified flow chart of an embodiment of a pay table development program routine.

This technique of pay table development may be summarized with reference to the program routine flow chart 50 illustrated in FIG. 4. At 51, the developer defines the physical parameters of the model and then, at 52, runs a Monte Carlo test to determine the probability of occurrence of each of the possible outcomes, using a random sampling of sets of starting conditions. The routine then checks at 53 to see if the distribution of outcomes is satisfactory, i.e., either provides a realistic simulation of actual physical game conditions or provides a distribution which will be conducive to generating player interest and excitement. If not, the developer may alter the physical model. Otherwise, the routine proceeds to 54, to assign a win amount to each outcome, based upon its probability of occurrence and then, at 55, determines the pay table percentage. The routine then checks at 56 to see if the pay table percentage is satisfactory e.g., to meet the requirements of maintaining player interest, while at the same time providing satisfactory return to the gaming establishment in which the video game is located. If not, the win amounts may be altered accordingly at 54. Otherwise, the routine is completed.

Figure 5:
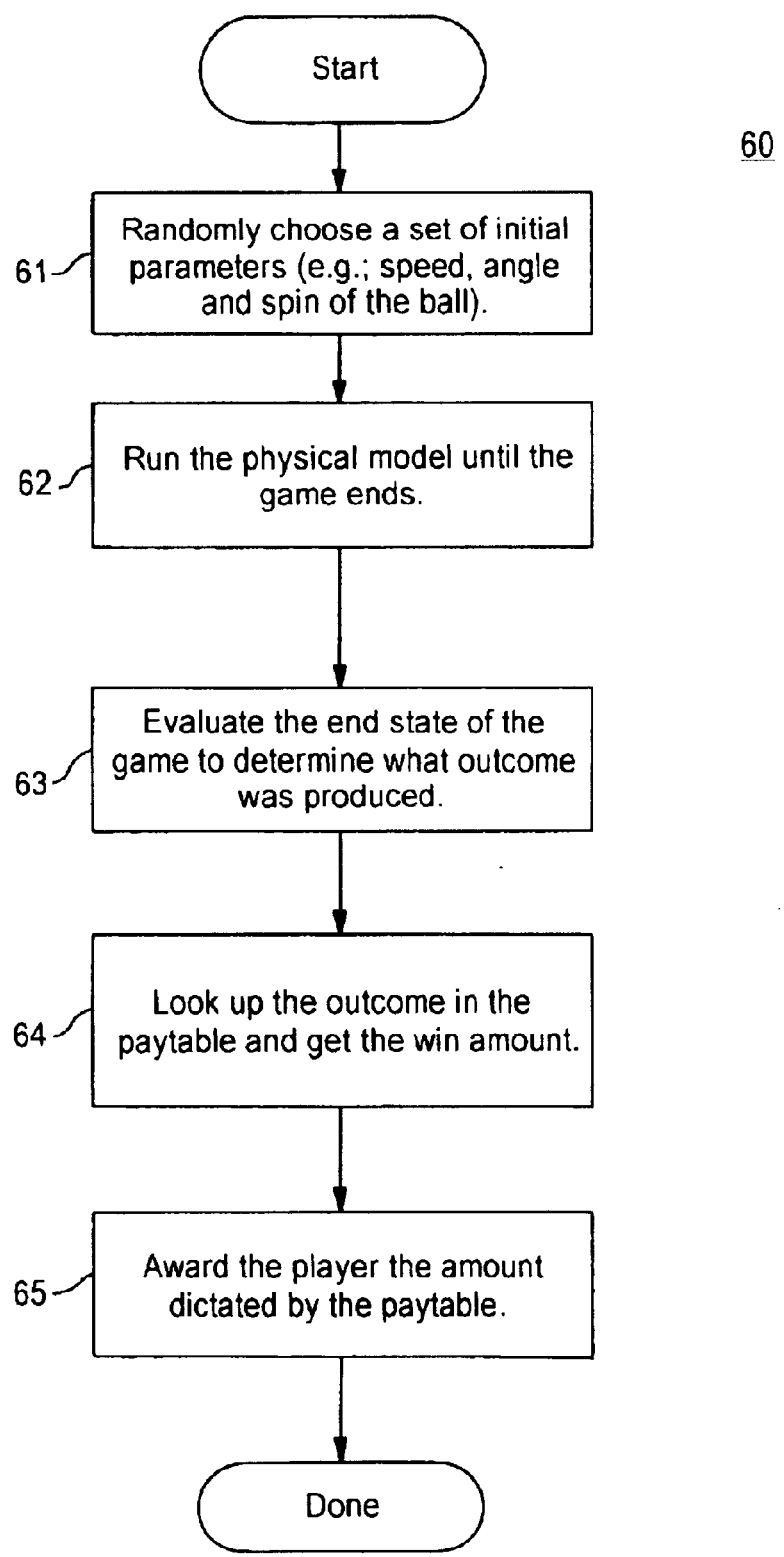
FIG. 5 is a simplified flow chart of a program routine for game play with a pay table developed in accordance with FIG. 4.

In order to play the game, the player would first activate the game by placing a wager, such as by inserting coins or bills into the appropriate slot 24 or 25. This would typically result in the gaming machine 20 displaying on the display 22 a representation of the game play field and, possibly other indicia. A particular wager amount may entitle a player to a certain number of balls. Individual ball launches could be triggered by the player actuating one of the buttons or other control devices 23. Referring to the flow chart 60 in FIG. 5, when a ball launch signal is input by the player, the program routine, at 61, randomly chooses a set of initial parameters or conditions for the ball. This may be done by randomly selecting each parameter individually as described above. Then, at 62, the routine plays the game by running the selected set of initial conditions through the model until an outcome is reached. Then, at 63, the routine evaluates the final resting position of the ball, i.e., which slot it wound up in, to determine what outcome was produced and then, at 64, looks up the outcome in the pay table of Table 4 to determine the win amount. Then, at 65, that amount is awarded to the player. This is repeated for each ball launch, and win amounts awarded for the several balls are accumulated until the supply of balls is exhausted.

It will be appreciated that with this technique, the outcome of each play is completely unpredictable, i.e., the outcome is unknown until it is reached.

Technique 2—Limited Initial Conditions

This technique is a modification of technique 1, described above. In technique 1, while millions of games are played in the Monte Carlo test, the only thing that is recorded is the outcomes in order to determine their probability of occurrence. In the limited initial condition technique, the model again compiles a list of thousands or millions of entries by randomly selecting sets of initial conditions and running them through the model to determine the outcomes, but in this case both the initial conditions and the outcome are recorded, as illustrated in Table 5.

TABLE 5

| Speed | Angle | Spin | Outcome |
|---|---|---|---|
| 3245 | 9558 | 53835 | Slot 4 |
| 3634 | 46742 | 65452 | Slot 4 |
| 12 | 325 | 0 | Slot 1 |
| 32432 | 54353 | 32212 | Slot 2 |
| 23423 | 35345 | 21223 | Slot 2 |
| 5412 | 2357 | 22349 | Slot 3 |
| . . . The list may contain thousands or millions of entries . . . | | | |

Figure 6:
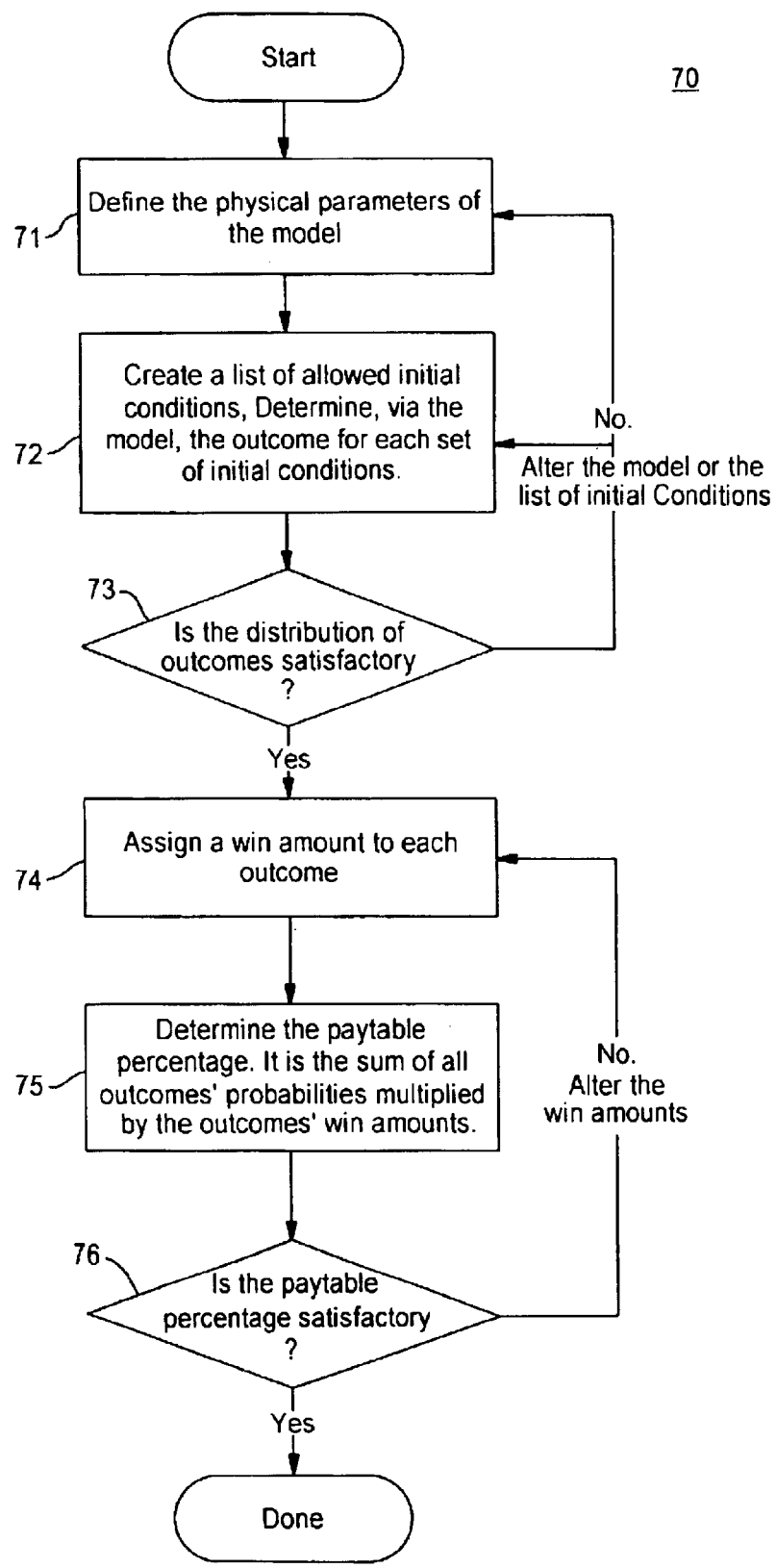
FIG. 6 is a simplified flow chart of a program routine for another embodiment of play table development.

The flow chart 70 for this technique is set forth in FIG. 6. As can be seen, the routine first, at 71, defines the physical parameters of the model and, at 72, creates the list of allowed initial conditions and determines their outcomes by running them through the model. The probability of occurrence of each outcome is then determined and listed, as described above, resulting in Table 6.

TABLE 6

| Outcome | Probability |
|---|---|
| Slot 1 | 35% |
| Slot 2 | 5% |
| Slot 3 | 1% |
| Slot 4 | 59% |
| Total | 100% |

Then, at 73, the routine checks to see if the distribution of outcomes is satisfactory. If not, the routine can either alter the mathematical model at 71 or alter the list of initial conditions at 72 by, for example, removing entries for outcomes that are desired to be made more rare, or adding entries for outcomes that are desired to be made more common. Alternatively, each set of initial conditions could be assigned an arbitrary probability of occurrence, which would then be applied when the game randomly draws a set of initial conditions during play of the game, as explained more fully below. However, it is preferred to add or subtract sets of initial conditions which will produce the desired outcome, since this produces a greater variety of games and preserves the random look of the full model behavior technique described above.

Then, at 74, the routine assigns a win amount to each outcome and then, at 75, determines the pay table percentage in the same manner described above, and then checks at 76 to see if the pay table percentage is satisfactory. If not, the win amounts may be altered at 74, otherwise, the pay table is completed.

The probability information is inherent in the list of sets of initial conditions and, therefore, need not be stored in the final pay table. The final pay table only requires the list of initial conditions i.e., Table 5 minus the outcomes, which are implied by the model and the list of outcomes and win amounts, as in Table 7.

TABLE 7

| Outcome | Win Amount |
|---|---|
| Slot 1 | 1 |
| Slot 2 | 8 |
| Slot 3 | 20 |
| Slot 4 | 0 |

Note that it would also be possible to add the win amounts to the list of sets of initial conditions, so that the outcomes and win amounts would be determined immediately upon random selection of a set of initial conditions, rather than waiting for the set of initial conditions to be run through the model to determine the outcome. However, that would consume much more space in memory, since the list of sets of initial conditions contains thousands or millions of entries or sets, whereas Table 7 has only four entries.

Figure 7:
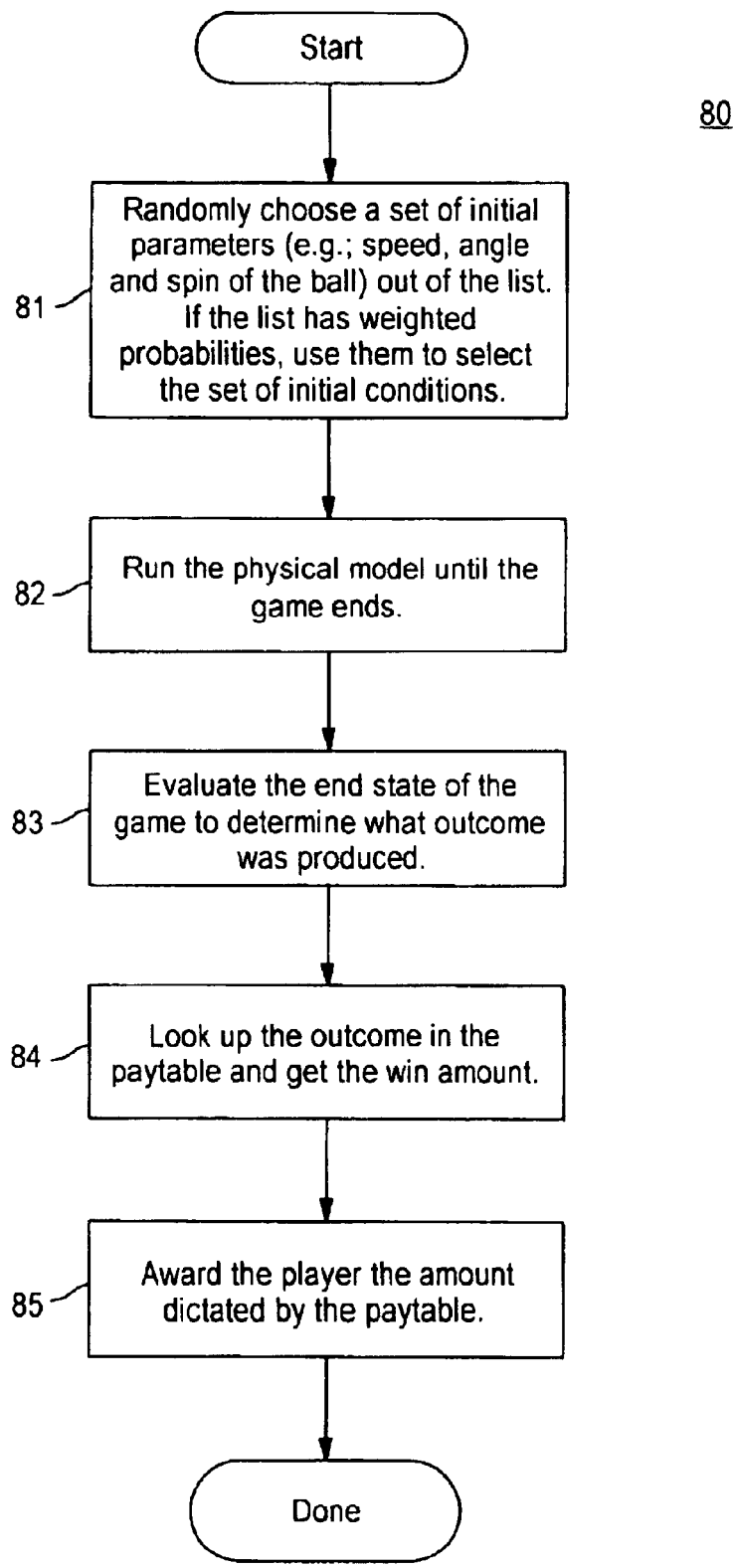
FIG. 7 is a simplified flow chart of game play using a pay table developed in accordance with FIG. 6.

Referring to FIG. 7, there is illustrated a flow chart 80 of a routine for playing the game in accordance with this limited initial conditions technique of pay table determination. At 81, the routine randomly chooses a set of initial conditions from the list of sets. If the list has weighted probabilities associated with the sets, those probabilities are used in the random selection process. Then, the selected set of initial conditions is run through the physical model at 82 to a final resting condition or end point. Then, at 83, the routine evaluates the final condition to determine what outcome was produced and then, at 84, looks up the outcome in the pay table to determine the win amount and then, at 85, awards that win amount to the player.

Accordingly, it can be seen that in this method, only the sets of initial conditions listed in the pay table are possible of selection, whereas in the full model behavior method described above, any of possibly trillions of initial condition sets could be randomly selected. However, the number of sets of initial conditions in the list is sufficiently large that the distribution of outcomes will be substantially the same as for the full model behavior technique.

Technique 3—Discrete Paths

Figure 8:
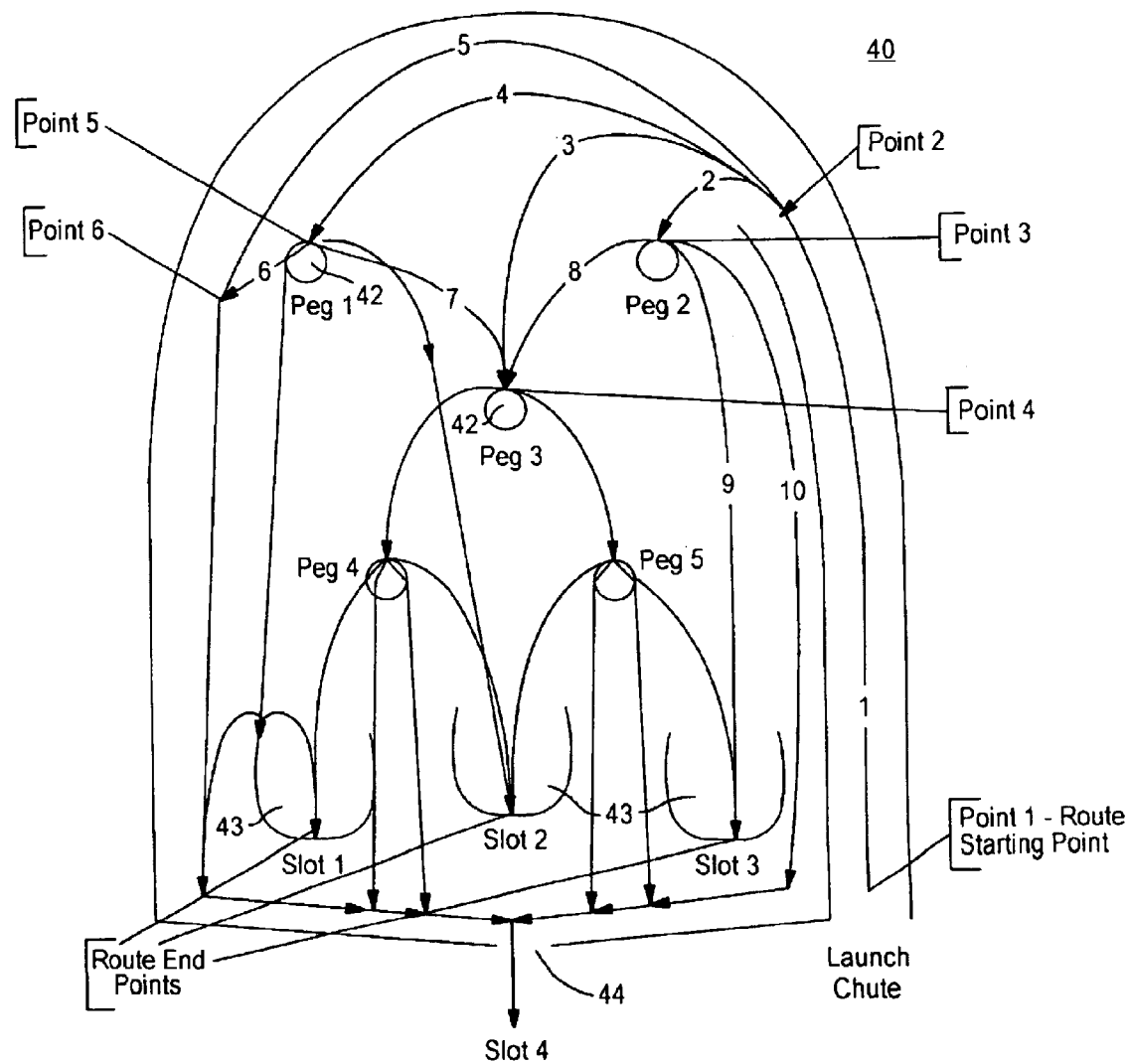
FIG. 8 is a simplified diagrammatic illustration of a pachinko play field showing another embodiment of game play.

This technique starts with the full model of the real game, as outlined above, but breaks down the possible routes of the ball to a finite set of the most common route segments or paths. A number of such paths are illustrated in FIG. 8. More specifically, FIG. 8 designates paths by continuous lines terminating in arrowheads, a number of the paths being consecutively numbered. Each path has a beginning point and an ending point. Points that do not have any paths starting from them are designated as route end points. It can be seen that a ball route is made up of a series of connected paths, with all routes starting at point 1, which is the starting point for path 1, and ending with a path which terminates in one of the slots. It will be appreciated that FIG. 8 is greatly simplified, and that in reality there will be many more possible paths. However, FIG. 8 is sufficient to illustrate the principles involved. Thus, it can be seen that the play field is broken down into a number of paths and a number of points, such that at least one path starts from every point except a route end point, and at least one path terminates at every point except the route starting point (point 1).

Figure 9:
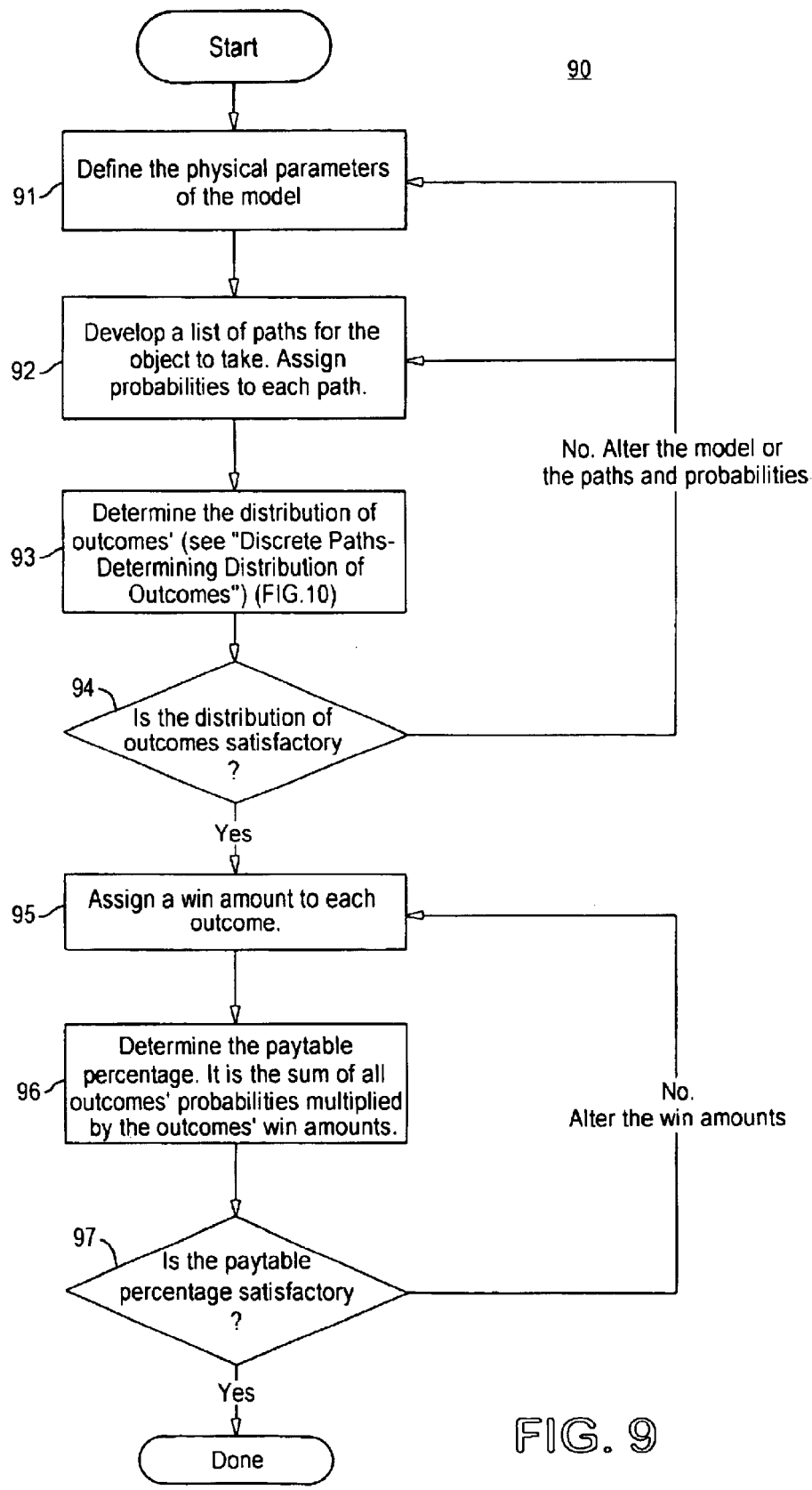
FIG. 9 is a simplified flow chart of a program routine for another embodiment of pay table development.

Referring to FIG. 9, the flow chart 90 is a routine for developing a pay table in accordance with this technique. At 91, the routine first defines the physical parameters of the model as described above, and then, at 92, develops a list of paths for the object to take and assigns a probability of occurrence to each such path. This list may be developed by having the model sample millions of possible sets of initial conditions to produce the set of most common paths. Such a list of paths is set forth in Table 8, and includes the path number, the starting and ending points of the path, and all relevant data required to specify the path. This data may be a list of points through which the object travels along the path, or a starting point and starting conditions. The preferred technique is to store a set of starting conditions for each path, such that applying those starting conditions to the model causes the object (ball) to traverse the path to its ending point. For example, referring to FIG. 8 and Table 8, it can be seen that path 1 starts at point 1 and ends at point 2, whereas path 4 starts at point 2 and ends at point 5.

TABLE 8

| | | Paths | | | |
|---|---|---|---|---|---|
| Path Number | Starting Point | Ending Point | Initial Speed | Initial Angle | Initial Spin |
| 1 | 1 | 2 | 23443 | 34221 | 1210 |
| 2 | 2 | 3 | 65234 | 365 | 343 |
| 3 | 2 | 4 | 474 | 5335 | 4 |
| 4 | 2 | 5 | 32 | 4365 | 854 |
| 5 | 2 | 6 | 44574 | 366 | 5436 |
| 6 | 5 | 6 | 4432 | 37 | 9665 |
| 7 | 5 | 4 | 5474 | 343 | 964 |
| 8 | 3 | 4 | 2233 | 3234 | 7895 |
| . . . Table shortened for simplicity . . . | | | | | |

As can be seen from FIG. 8, each point, except a route end point (in one of the slots) has associated with it a list of paths which may originate from it. The probability of occurrence of each path represents the likelihood of the ball taking that path from the point. Points that do not have any paths starting from them are designated as route end points. Each route end point has an associated game outcome. Table 9 lists the first six points on FIG. 8, the paths that may start from each and the probability for each such path. Initially, these probabilities are assigned arbitrarily, except in the case of point 1, which has only one path leading from it, the probability of occurrence of which must, therefore, be 100%.

TABLE 9

| | Points | |
|---|---|---|
| Point number | Paths that may start from this point | Probability of each path |
| 1 | 1 | 100% |
| 2 | 2 | 30% |
| | 3 | 20% |
| | 4 | 40% |
| | 5 | 10% |
| 3 | 8 | 40% |
| | 9 | 30% |
| | 10 | 30% |
| 4 | 11 | 50% |
| | 12 | 50% |
| 5 | 6 | 50% |
| | 7 | 20% |
| | 13 | 10% |
| | 14 | 20% |
| 6 | 15 | 100% |
| . . . Table shortened for simplicity . . . | | |

Figure 10:
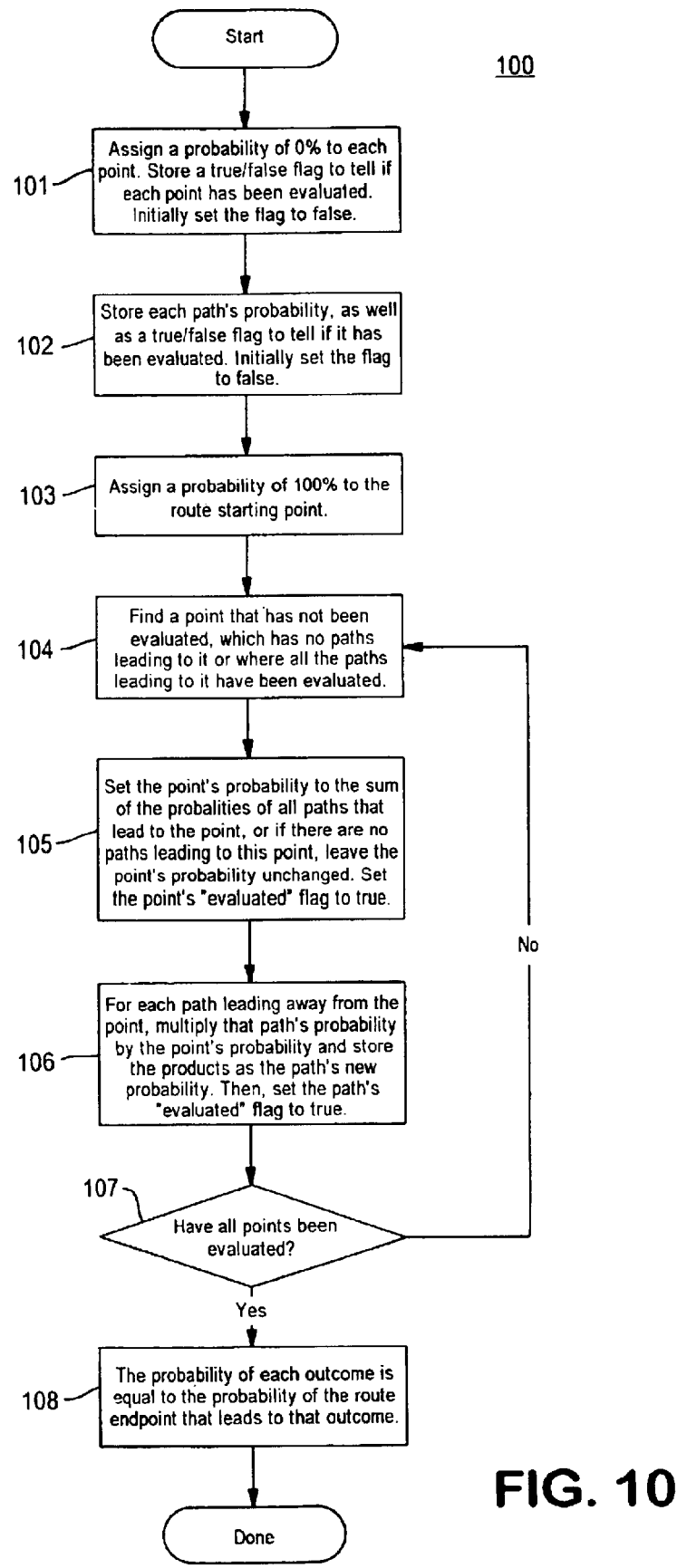
FIG. 10 is a simplified flow chart of a program routine for determining the distribution of outcomes in connection with the flow chart of FIG. 9.

The routine then, at 93, determines the distribution of outcomes utilizing the subroutine 100 of FIG. 10. Referring to FIG. 10, the routine initially assigns a probability of 0% to each point, stores a true/false flag to tell whether or not the point has been evaluated, and initially sets the flag to "false." Then, at 102, the routine stores each path's probability, as well as a true/false flag to tell whether or not it has been evaluated, initially setting the flag to "false." Then, at 103, the routine assigns a probability of 100% to the route starting point (point 1). There results a points list (see Table 10) and a paths list (see Table 11). Tables 10 and 11 represent the conditions of the points and paths lists the first time through the subroutine 100.

TABLE 10

Paths

| Point number | Probability | Evaluated | Paths that may start from this point |
|---|---|---|---|
| 1 | 100% | False | 1 |
| 2 | 0% | False | 3 |
|   | 0% | False | 3 |
|   | 0% | False | 4 |
|   | 0% | False | 5 |
| 3 | 0% | False | 8 |
|   | 0% | False | 9 |
|   | 0% | False | 10 |
| 4 | 0% | False | 11 |
|   | 0% | False | 12 |
| 5 | 0% | False | 6 |
|   | 0% | False | 7 |
|   | 0% | False | 13 |
|   | 0% | False | 14 |
| 6 | 0% | False | 15 |

. . . Table shortened for simplicity . . .

TABLE 11

Paths

| Path number | Starting Point | Ending Point | Probability | Evaluated |
|---|---|---|---|---|
| 1 | 1 | 2 | 100% | False |
| 2 | 2 | 3 | 30% | False |
| 3 | 2 | 4 | 20% | False |
| 4 | 2 | 5 | 40% | False |
| 5 | 2 | 6 | 10% | False |
| 6 | 5 | 6 | 50% | False |
| 7 | 5 | 4 | 20% | False |
| 8 | 3 | 4 | 40% | False |

. . . Table shortened for simplicity . . .

Then, at 104, the routine finds a point that has not been evaluated, which has no paths leading to it or where all the paths leading to it have been evaluated. The first time through this subroutine, the only point which meets these criteria will be point 1. Then, at 105, the subroutine sets the point's probability to the sum of the probabilities of all paths that lead to the point or, if there are no paths leading to the point (which is the case for point 1), leaves the point's probability unchanged, and then sets the point's evaluated flag to "true." Thus, at this point, Table 10 has been changed to list the evaluated flag for point 1 as "true," but is otherwise unchanged. Then, at 106, for each path leading away from the point, the routine multiplies that path's probability by the point's probability and stores the product as the path's new probability, then sets the path's evaluated flag to "true." In this case, point 1's probability is 100% and the only path leading from it is path 1, which also has a probability of 100%. Thus the new probability for path 1 remains 100%, so that the only change in Table 11 is to change the evaluated flag for path 1 to "true."

The routine then checks at 107 to see if all points have been evaluated. If not it returns to 104 and again looks for a point that has not been evaluated and where all the paths leading to it have been evaluated. The only point which meets these criteria now is point 2, which has not been evaluated but which has all paths leading to it (path 1) evaluated. Since the probability of path 1 is 100%, the routine, at 105, sets point 2's probability to 100% and sets its evaluated flag to "true," changing Table 10 accordingly. Point 2 has four paths leading from it, viz, paths 2, 3, 4 and 5. Thus, at 106 of the routine, for each of those paths, its probability is multiplied by the probability of point 2 (100%) so that the initial probabilities of those paths remain unchanged, and then their evaluated flags are set to "true," changing Table 11 accordingly.

The next time through 104 of the routine, the only point which meets the criteria will be point 3, which has only one path (path 2) leading to it, which path has now been evaluated. Thus, at 105, the probability of point 3 is set to the probability of path 2 (30%) and its evaluated flag is set to "true," changing Table 10 accordingly, so that it now appears as in Table 12.

TABLE 12

Points

| Point number | Probability | Evaluated | Paths that may start from this point |
|---|---|---|---|
| 1 | 100% | True | 1 |
| 2 | 100% | True | 2 |
|   |   |   | 3 |
|   |   |   | 4 |
|   |   |   | 5 |
| 3 | 30% | True | 8 |
|   |   |   | 9 |
|   |   |   | 10 |
| 4 | 0% | False | 11 |
|   |   |   | 12 |
| 5 | 0% | False | 6 |
|   |   |   | 7 |
|   |   |   | 13 |
|   |   |   | 14 |
| 6 | 0% | False | 15 |

. . . Table shortened for simplicity . . .

Point 3 has three paths leading away from it (paths 8, 9 and 10). Thus, at 106, those paths' probabilities are multiplied by the probability of point 3 and their paths' evaluated flags are set to "true", changing Table 10 accordingly, resulting in Table 13.

TABLE 13

Paths

| Path number | Starting Point | Ending Point | Probability | Evaluated |
|---|---|---|---|---|
| 1 | 1 | 2 | 100% | True |
| 2 | 2 | 3 | 30% | True |
| 3 | 2 | 4 | 20% | True |
| 4 | 2 | 5 | 40% | True |
| 5 | 2 | 6 | 10% | True |
| 6 | 5 | 6 | 50% | False |
| 7 | 5 | 4 | 20% | False |
| 8 | 3 | 4 | 12% | True |

. . . Table shortened for simplicity . . .

Thus, for example, the original probability of path 8 (40%) is multiplied by 30% to arrive at a new path 8 probability of 12% (paths 9 and 10 are omitted from the tables for brevity).

The subroutine 100 continues looping through 104–107 in this manner until all points have been evaluated. Then, at 108, the probability of each outcome is determined as being the probability of the route end point that results in that outcome. Then, returning to FIG. 9, the routine 90 resumes at 94 to check to see if the distribution of outcomes is satisfactory. If not, the physical model may be altered at 91 and/or the list of paths may be altered at 92. Otherwise, the routine at 95, assigns a win amount to each outcome and then, at 96, determines the pay table percentage in the manner described above, and then checks at 97 to see if it is satisfactory. If not, the win amounts may be altered at 95, otherwise, the pay table development is completed, resulting in a pay table percentage as illustrated in Table 14.

TABLE 14

| Outcome | Probability | Win Amount | Contribution to paytable percentage |
|---|---|---|---|
| Slot 1 | 35% | 1 | 35% |
| Slot 2 | 5% | 8 | 40% |
| Slot 3 | 1% | 20 | 20% |
| Slot 4 | 59% | 0 | 0% |
| Total | 100% | | 95% |

Figure 11:
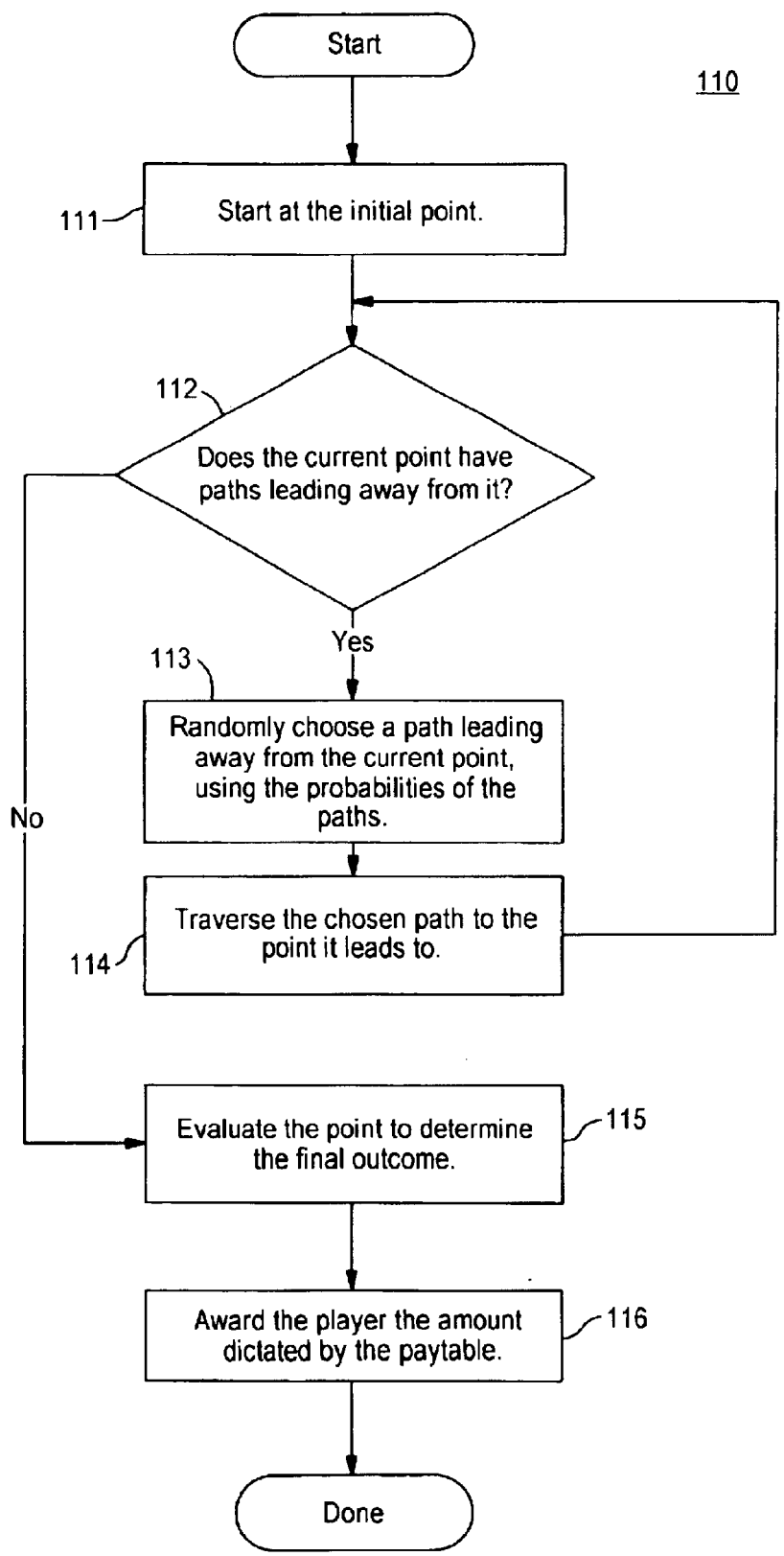
FIG. 11 is a simplified flow chart of game play using a pay table developed in accordance with FIGS. 9 and 10.

Referring now to FIG. 11, there is illustrated a program routine 110 governing the play of the game in accordance with this technique. When a ball launch is initiated by the player, the routine, at 111, starts at the route starting point (point 1) and then, at 112, checks to see if the current point has any paths leading away from it. In this case it does (path 1). Then, at 113, the routine randomly chooses one of the paths leading away from the current point, using the probabilities of the paths. In this case, there is only one such path (path 1) so it is necessarily chosen. Then, at 114, the routine traverses that path to the point (point 2) that it leads to and returns to 112. This time through the loop, the current point (point 2) has four paths leading from it so, at 113, the routine randomly chooses one of them in accordance with their probabilities, traverses it at 114 and returns to 112. The routine continues in this manner until, at 112, the current point has no paths leading away from it, signifying that it is a route end point. The routine then moves to 115 to evaluate the point and determine the final outcome and, at 116, awards the player the win amount corresponding to that outcome from the pay table.

Technique 4—Reverse Play

Figure 12:
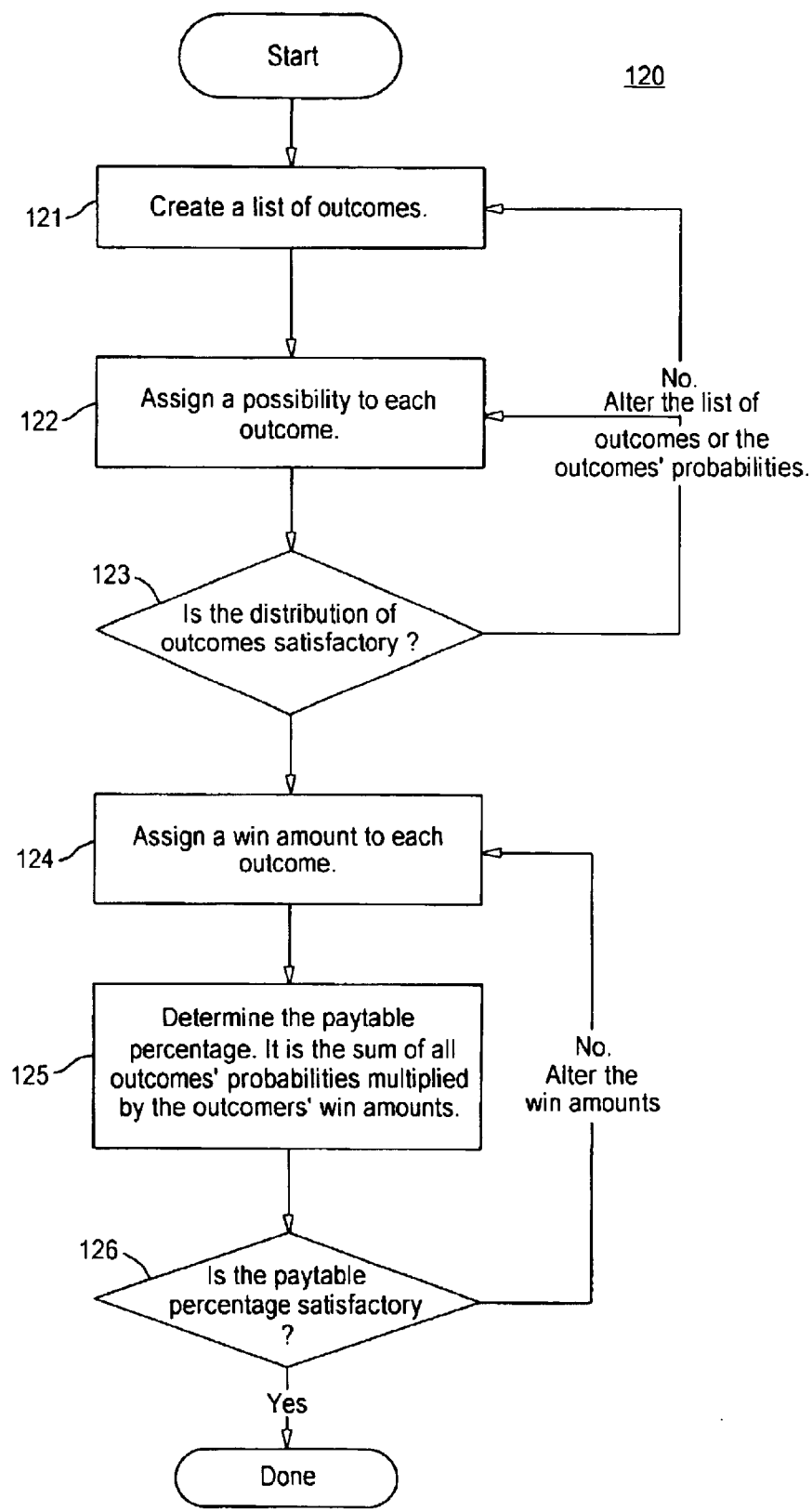
FIG. 12 is a simplified flow chart of a program routine for another embodiment of pay table development.

In this method, the outcome is determined first, then the required initial conditions are generated to produce that outcome. The game is then played from those initial conditions. Referring to FIG. 12, there is illustrated a program routine 120 for pay table development using this technique. The routine first, at 121, creates a list of outcomes and then, at 122, assigns a probability of occurrence to each outcome. In the illustrated example, there are only four possible outcomes, and the assigned probabilities may be those set forth in Table 14. The routine then checks at 123 to see if the distribution of outcomes is satisfactory. If not, either the list could be altered at 121 to add or delete outcomes, or the probabilities could be altered at 122. If the outcomes' distribution is satisfactory at 123, the routine then, at 124, assigns a win amount to each outcome and then determines the pay table percentage at 125, resulting in a pay table such as that illustrated in Table 15.

TABLE 15

| Outcome | Probability | Win Amount | Contribution to paytable percentage |
|---|---|---|---|
| Slot 1 | 35% | 1 | 35% |
| Slot 2 | 5% | 8 | 40% |
| Slot 3 | 1% | 20 | 20% |
| Slot 4 | 59% | 0 | 0% |
| Total | 100% | | 95% |

At 126, the routine checks to see if the pay table percentage is satisfactory. If not, the win amounts may be altered at 124, otherwise pay table development is completed.

Figure 13:
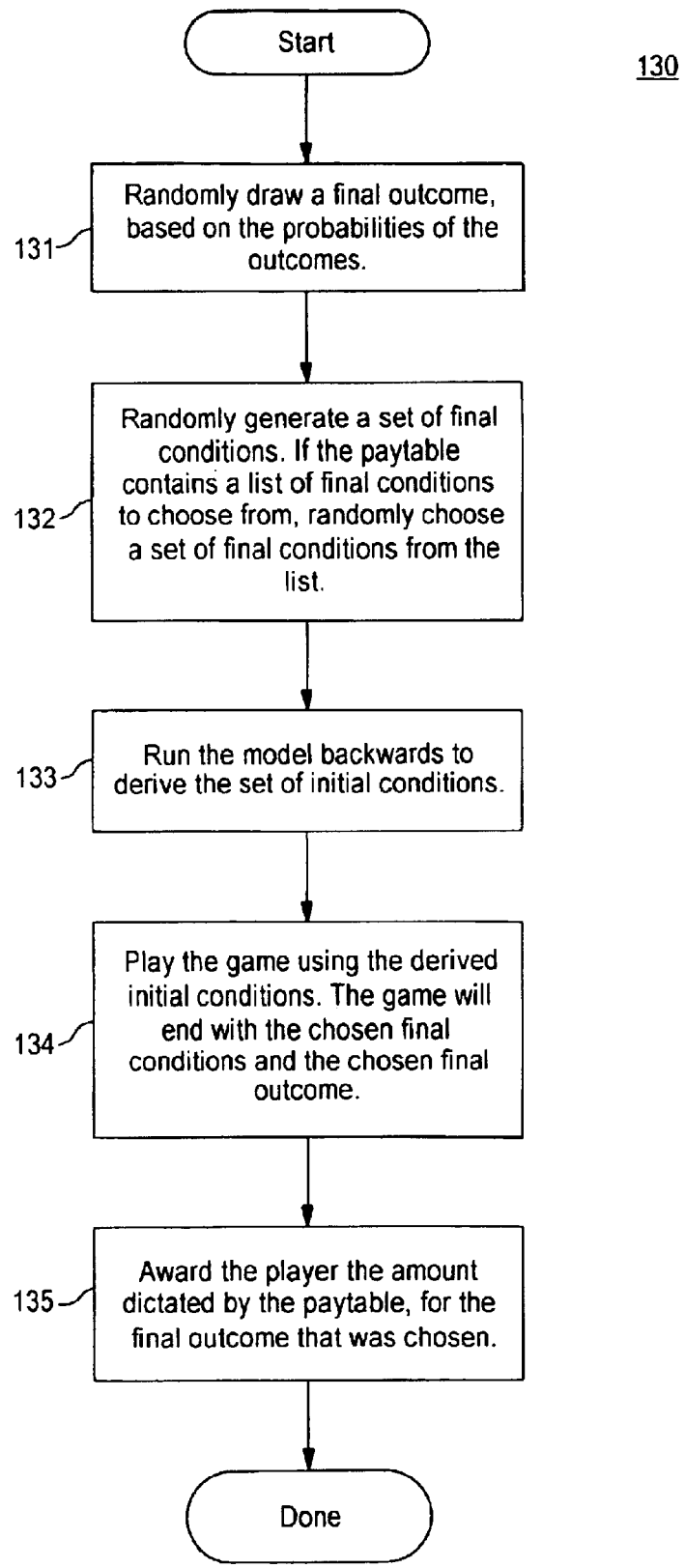
FIG. 13 is a simplified flow chart of a game play using a pay table developed in accordance with FIG. 12.

Referring to FIG. 13, there is illustrated a program routine 130 for a play of the game in accordance with this technique of pay table development. At 131, the routine randomly draws a final outcome from the list of outcomes, based upon the probabilities of the outcomes. Then, at 132, the routine randomly generates a set of final conditions, such as final velocity, angle, spin of the ball associated with the selected final outcome. Alternatively, the pay table may have associated with each outcome a list of final conditions to choose from. Then, at 133, a routine runs the model backwards from the outcome, using the selected set of final conditions, to derive a set of initial conditions which would lead to that outcome. Then, at 134, the routine runs the derived set of initial conditions through the model to play the game forward, whereupon the game will end with the originally selected outcome. The routine then at 135 awards the player the win amount dictated by the pay table for that outcome.

In this technique, because the final outcome is known from the start, very fast evaluation is provided.

Discrete Paths, Reverse Play

As was indicated above, it is possible to combine steps from different techniques to arrive at hybrid techniques. As an illustration, the reverse play technique 4 may be combined with the discrete paths technique 3. In this case, the pay table is generated in the same manner as for technique 3, described above, but the direction of the paths is reversed. Each route end point is assigned a probability of occurrence, wherein the probabilities of all of the route end points add up to 100%, resulting in Table 16.

TABLE 16

| Outcome | Win Amount | Route End Points | Probability |
|---|---|---|---|
| Slot 1 | 1 | 13 | 35% |
| Slot 2 | 8 | 14 | 5% |
| Slot 3 | 20 | 15 | 1% |
| Slot 4 | 0 | 16 | 59% |
| Total | | | 100% |

The calculation of the pay table percentage is the same as was described above.

The pay table stores lists of paths and points, as in technique 3, described above. The list of paths may be substantially the same as Table 8 above. However, there is associated with each point a list of paths that leads to it, rather than away from it, and the probability assigned to each path is the probability of that path being chosen as the path to use to get to the point, resulting in Table 17.

TABLE 17

Points

| Point number | Paths that end at this point | Probability of choosing the path |
|---|---|---|
| 2 | 1 | 100% |
| 3 | 2 | 100% |
| 4 | 3 | 50% |
|   | 7 | 20% |
|   | 8 | 30% |
| 5 | 4 | 100% |
| 6 | 5 | 16% |
|   | 6 | 84% |
| ... Table shortened for simplicity ... | | |

Figure 14:
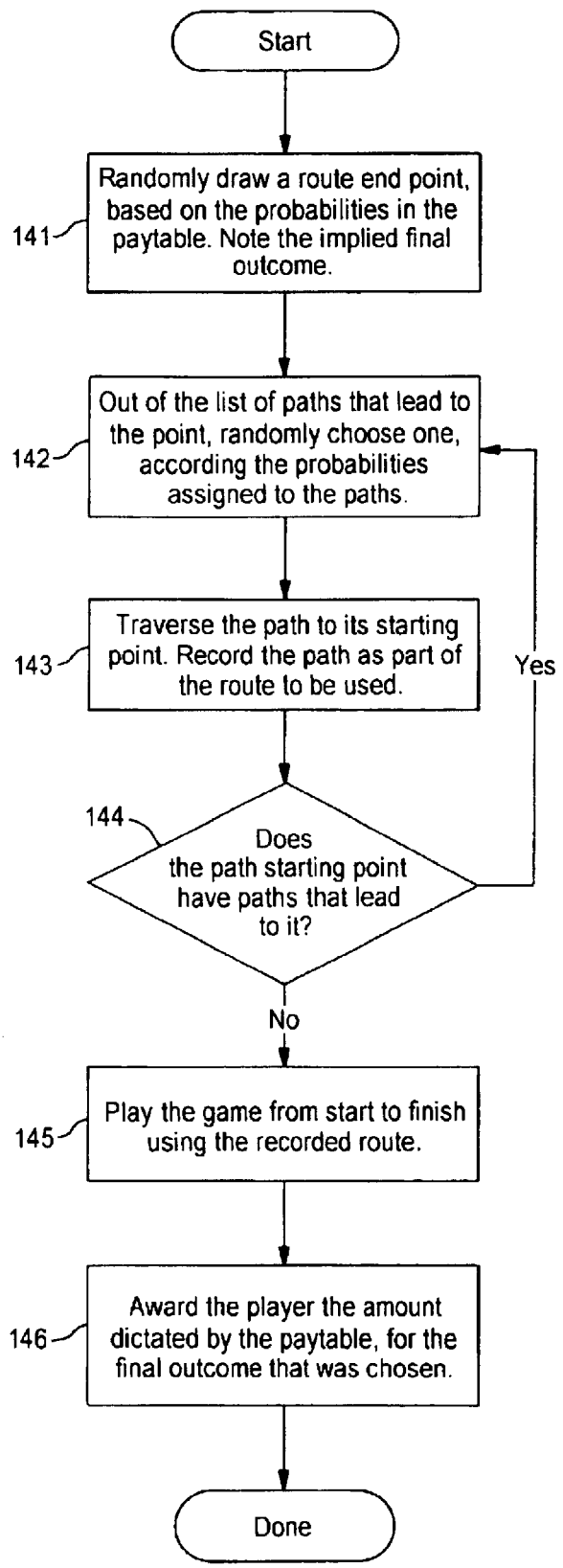
FIG. 14 is a simplified flow chart of another embodiment of game play utilizing a pay table developed in accordance with a combination of FIGS. 9, 10 and 13.

Referring to FIG. 14, there is shown a flow chart for a routine 140 for playing the game in accordance with this technique. When a ball launch is activated by the player, the routine at 141 randomly selects a route end point, based upon the probabilities in the pay table, and notes the implied final outcome. Then, at 142, out of the list of paths that lead to that end point, the routine randomly chooses one according to the probabilities assigned to the paths. Next, at 143, the routine traverses the path in reverse direction to its starting point, recording the path as part of the route to be used. Then, at 144, the routine checks to see if the path starting point has paths that lead to it. If it does, the routine returns to 142 and continues in this loop until it reaches a point that has no paths leading to it, which must be the route starting point. Then, at 145, the routine plays the game forwardly from start to finish using the recorded route and then, at 146, awards the player the amount dictated by the pay table for the final outcome that was chosen.

As was indicated above, a game such as pachinko may provide an added complication in that it is possible for two or more balls to collide. In such a case, a number of different possibilities exists for handling a collision.

(1) Award or bonus associated with the collision (the bonus could be preset or randomly drawn from a range of values). Then, swap the trajectories of the two balls that have collided such that each ball takes the other ball's trajectory and arrives at its outcome. This makes collisions easy to account for in pay table evaluation, since the final outcome is only affected by the addition of a collision bonus.

(2) Award, as a collision bonus, the amount that each ball individually would have been awarded, had it continued on its initial trajectory without colliding. At this point, the payout is the same as if the balls had not collided, but had passed through each other. Then, either let the balls continue randomly from that point, to yield an additional outcome and payout, or assign the balls new trajectories (which could be held in a bonus pay table) to yield new outcomes. In either case, the final outcome of the balls affects the collision's bonus. To calculate the effect to the pay table, compute the probability of a collision and the probabilities and payouts of the different outcomes after the collision.

(3) Award no bonus payout due to a collision. Rather, award a bonus ball, the outcome of which produces an additional payout. The possible outcomes of the bonus ball could be stored in a bonus pay table.

It will be appreciated that other variations of the above-described techniques would be possible, but the foregoing techniques are described in detail to illustrate the principles involved.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method of operating a video gaming machine which has a video display and an object launch actuator and simulates a real physical game initiated by placing an object in motion in accordance with a set of initial conditions and proceeding to one of a plurality of outcomes corresponding respectively to final resting conditions of the object, the method comprising:

establishing in software a mathematical model of the game including a plurality of rules governing movement of the object once it is placed in motion, establishing a range of possible values for each of a plurality of parameters, displaying a play field on the video display, activating the object launch actuator and in response thereto causing software to randomly select for each parameter a value from its associated range of values to establish the set of initial conditions, running the set of initial conditions through the model for simulating movement of the object to a final resting condition to determine the outcome, and displaying on the video display the simulated movement of the object along the displayed play field.

2. The method of claim 1, wherein the parameters include velocity, angle or direction and spin or rotation.

3. The method of claim 1, wherein the object is a ball.

4. The method of claim 1, and further comprising predetermining a pay table including a list of possible outcomes and a corresponding win mount for each outcome and, after determining the outcome, looking up the outcome in the pay table and awarding the player the corresponding win amount.

5. A method of operating a video gaming machine which has a video display and an object launch actuator and simulates a real physical game initiated by placing an object in motion in accordance with a set of initial conditions and proceeding to one of a plurality of outcomes corresponding respectively to final resting conditions of the object, the method comprising:

establishing in software a mathematical model of the game including a plurality of rules governing movement of the object once it is placed in motion, establishing a collection of sets of initial conditions large enough to simulate random play and assigning to each set a probability of occurrence, displaying a play field on the video display, activating the object launch actuator and in response thereto causing software to randomly select a set of initial conditions from the collection in accordance with their probabilities of occurrence, running the selected set of initial conditions through the model for simulating movement of the object to a final resting condition to determine the outcome, and displaying on the video display the simulated movement of the object along the displayed play field.

6. The method of claim 5, wherein the collection of sets of initial conditions is established by running the model a large number of times using a different set of initial conditions each time and recording each set of initial conditions and its outcome, and selecting from the recorded sets of initial conditions the collection of sets.

7. The method of claim 6, and further comprising assigning to each set of initial conditions in the collection an identifying number to make up a range of numbers, the random selection of a set of initial conditions from the collection being effected by randomly selecting a number in the range and looking up the corresponding set of initial conditions.

8. The method of claim 5, wherein the parameters include velocity, angle or direction and spin or rotation.

9. The method of claim 5, and further comprising predetermining a pay table including a list of possible outcomes and a corresponding win amount for each outcome and, after determining the outcome, looking up the outcome in the pay table and awarding the player the corresponding win amount.

10. The method of claim 5, wherein the object is one of plural objects, and further comprising performing the last three steps of the method of claim 5 for each object.

11. The method of claim 10, wherein the objects are balls.

12. The method of claim 10, and further comprising establishing a collision bonus for each collision of one object with another.

13. The method of claim 12, wherein the objects are balls, the collision bonus including awarding the player an additional ball.

14. The method of claim 12, and further comprising predetermining a pay table including a list of possible outcomes and a corresponding win amount for each outcome, after determining the outcome for each object, looking up each outcome in the pay table and awarding the player the corresponding win amount, the collision bonus including an additional win amount.

15. The method of claim 14, wherein the collision alters the paths of the objects and, therefore, their final outcomes, the collision bonus being the win amounts corresponding to the outcomes the colliding objects would have reached had the balls not collided.

16. The method of claim 14, wherein the collision does not affect the paths of the balls, the collision bonus being an arbitrary win amount.

17. A method of operating a video gaming machine which has a video display and an object launch actuator and simulates a real physical game initiated by placing an object in motion in accordance with a set of initial conditions and proceeding along a route to one of a plurality of outcomes corresponding respectively to final resting conditions of the object, the method comprising:
 displaying a play field on the video display,
 determining a finite collection of points on a play field including a route starting point and at least one route end point corresponding to a final resting condition and a finite collection of possible paths of the object from one point to another such that each point except route end points may have one or more paths leading away from it,
 assigning a probability of occurrence to each path and to each point,
 activating the object launch actuator and in response thereto causing software to randomly select a path from among the paths leading away from the route starting point in accordance with their probabilities of occurrence,
 causing simulated movement of the object along the selected path to the point it leads to,
 then randomly selecting a path from among the paths starting at the point at which the object is currently located in accordance with their probabilities of occurrence,
 then repeating the preceding two steps until a route end point is reached, and
 displaying on the video display the simulated movement of the object from route starting point to the route end point along the displayed play field.

18. The method of claim 17, wherein each point other than the route starting point and a route end point corresponds to an object-redirecting obstruction.

19. The method of claim 18, wherein the play field and the obstructions thereon are stationary.

20. The method of claim 17, wherein the object is a ball.

21. The method of claim 17, and further comprising predetermining a pay table including a list of possible outcomes and a corresponding win amount for each outcome and, after determining the outcome, looking up the outcome in the pay table and awarding the player the corresponding win amount.

22. A method of operating a video gaming machine which has a video display and an object launch actuator and simulates a real physical game initiated by placing an object in motion in accordance with a set of initial conditions and proceeding to one of a plurality of outcomes corresponding respectively to final resting conditions of the object, the method comprising:
 establishing in software a mathematical model of the game including a plurality of rules governing movement of the object once it is placed in motion,
 establishing a pay table including a list of possible outcomes and the probability of occurrence for each outcome,
 displaying a play field on the video display,
 activating the object launch actuator and in response thereto causing software to randomly select an outcome based on its probability of occurrence,
 running the selected outcome through the model in reverse to produce a set of initial conditions, then
 running the set of initial conditions through the model in proper order for simulating movement of the object to the selected outcome, and
 displaying on the video display the simulated movement of the object along the displayed play field.

23. The method of claim 22, and further comprising establishing for each outcome a set of final conditions.

24. The method of claim 23, wherein each set of final conditions is established by random selection from a collection of possible final conditions.

25. The method of claim 22, wherein the establishing of the pay table includes establishing a corresponding win amount for each outcome and further comprising looking up the selected outcome in the pay table and awarding the player the corresponding win amount.

26. A method of operating a video gaming machine which has a video display and an object launch actuator and simulates a real physical game initiated by placing an object in motion in accordance with a set of initial conditions and proceeding to one of a plurality of outcomes corresponding respectively to final resting conditions of the object, the method comprising:
 displaying a play field on the video display,
 determining a finite collection of points on the play field including a route starting point and at least one route end point corresponding to a final resting condition and a finite collection of possible paths of the object from one point to another such that each point except route end points may have one or more paths leading away from it, assigning a probability of occurrence to each path and to each point, causing software to randomly select a point from among the route end points in accordance with their probabilities of occurrence, activating the object launch actuator and in response thereto causing software to randomly select a path from among the paths leading to the selected route end point in accordance with their probabilities of occurrence, causing simulated movement of the object along the selected path in reverse to the point it leads away from, then randomly selecting a path from among the paths leading to the point at which the object is currently located in accordance with their probabilities of occurrence, then repeating the preceding two steps until the route starting point is reached, and then causing the object to retrace the selected paths from the route starting point to the selected route end point for simulating movement of the object along the route, and displaying on the video display the simulated movement of the object on the displayed play field along the route from the route starting point to the selected route end point.

27. The method of claim 26, wherein each point other than the route starting point and a route end point corresponds to an object-redirecting obstruction.

28. The method of claim 27, wherein the play field and the obstructions thereon are stationary.

29. The method of claim 26, wherein the object is a ball.

30. The method of claim 26, and further comprising establishing for each outcome a set of final conditions.

31. The method of claim 30, wherein each set of final conditions is established by random selection from a collection of possible final conditions.

32. The method of claim 26, and further comprising predetermining a pay table including a list of possible outcomes and a corresponding win amount for each outcome and, looking up the selected outcome in the pay table and awarding the player the corresponding win amount.

33. A video gaming machine which simulates a real physical game initiated by placing an object in motion in accordance with a set of initial conditions and proceeding to one of a plurality of outcomes corresponding respectively to final resting conditions of the object, the gaming machine comprising:

a player input device for activating the game, a display device, a processor operating under control of a stored program and responsive to the input device for controlling the display device, a memory device coupled to the processor and storing a mathematical model of the game including a plurality of rules governing movement of the object once it is placed in motion, and a pay table of win amounts respectively corresponding to different outcomes, and a payout mechanism, the processor program including a first routine responsive to a player input for randomly determining an origin state and running it through the model for simulating movement of the object to a final resting condition to determine an outcome and controlling the display device to display the simulated movement of the object, and a second routine for determining from the pay table a win amount corresponding to the outcome and actuating the payout mechanism to award that amount to the player.

34. The gaming machine of claim 33, wherein the origin state is defined by a set of initial conditions, and the first routine including a routine for randomly generating each initial condition of the set.

35. The gaming machine of claim 33, wherein the origin state is defined by a set of initial conditions, the memory device including means for storing a collection of sets of initial conditions, the processor program including a routine for randomly selecting a set of initial conditions from the collection.

36. The gaming machine of claim 33, wherein the memory device includes means for storing a plurality of points on a play field including a route starting point, one or more route end points and a plurality of intermediate points wherein each intermediate point has one or more paths leading to it and one or more paths leading away from it and the route starting point has one or more paths leading away from it and each route end point has one or more paths leading to it, the origin state being defined as the route starting point, the processor program including a routine for randomly selecting one of the paths leading from the route starting point and causing the object to traverse the selected path and then repeating the process until a route end point is reached.

37. The gaming machine of claim 33, wherein the memory device includes means for storing a collection of sets of final conditions respectively corresponding to outcomes, the processor program includes a routine for randomly selecting an outcome and a set of final conditions corresponding to it and then running the selected set of final conditions backwards through the model to determine the origin state.

38. A method of developing a pay table for a video gaming machine which has a video display and an object launch actuator and simulates a real physical game initiated by placing an object in motion in accordance with a set of initial conditions and proceeding to one of a plurality of outcomes corresponding respectively to final resting conditions of the object, the method comprising:

establishing in software a mathematical model of the game including a plurality of rules governing movement of the object once it is placed in motion, creating a list of outcomes, assigning a probability of occurrence to each outcome, assigning a win amount to each outcome, determining a pay table percentage by multiplying each outcome's probability of occurrence by its win amount and summing the products for all of the outcomes in the list, displaying a play field on the video display, activating the object launch actuator and in response thereto causing software to randomly determine a set of initial conditions and to run the model from the set of initial conditions for simulating movement of the object to a final resting condition, displaying on the video display the simulated movement of the object along the displayed play field, and consulting the pay table to award a win amount for the outcome corresponding to the final resting condition.

39. The method of claim 38, wherein the list of outcomes and their associated probabilities of occurrence are determined by selecting a plurality of sets of initial conditions and sequentially running the sets through the model to determine corresponding outcomes and to determine for each outcome a probability of occurrence.

40. The method of claim 39, wherein the sets of initial conditions are selected by randomly generating each condition of each set.

41. The method of claim 39, wherein the sets of initial conditions are selected by randomly selecting sets from a collection of sets of initial conditions.

42. The method of claim 38, wherein the list of outcomes is created by determining a finite collection of points on a play field including a route starting point and at least one route end point and a finite collection of possible paths of the object from one point to another, such that each point except a route end point has one or more paths leading away from it, and establishing for each point a probability of occurrence equal to the sum of the probabilities of all paths that lead to the point, setting an initial probability of occurrence for each path, and setting for each path a probability of occurrence equal to the path's probability multiplied by the probability of the point from which it leads.

* * * * *